US012071808B2

(12) United States Patent
Storen et al.

(10) Patent No.: US 12,071,808 B2
(45) Date of Patent: Aug. 27, 2024

(54) HIGH LOAD RETENTION SYSTEM FOR SECTIONAL OVERHEAD DOORS

(71) Applicant: Reliance Doors Pty Ltd, Brisbane (AU)

(72) Inventors: Nicholas Storen, Brisbane (AU); Stuart Steele, Brisbane (AU)

(73) Assignee: Reliance Doors Pty Ltd., Brisbane (AU)

( * ) Notice: Subject to any disclaimer, the term of this patent is extended or adjusted under 35 U.S.C. 154(b) by 567 days.

(21) Appl. No.: 17/280,441

(22) PCT Filed: Sep. 27, 2019

(86) PCT No.: PCT/AU2019/051052
§ 371 (c)(1),
(2) Date: Mar. 26, 2021

(87) PCT Pub. No.: WO2020/061646
PCT Pub. Date: Apr. 2, 2020

(65) Prior Publication Data

US 2021/0317700 A1 Oct. 14, 2021

(30) Foreign Application Priority Data

Sep. 27, 2018 (AU) ................................ 2018903645

(51) Int. Cl.
*E06B 3/48* (2006.01)
*E06B 3/44* (2006.01)
*E06B 3/70* (2006.01)

(52) U.S. Cl.
CPC ................ *E06B 3/486* (2013.01); *E06B 3/44* (2013.01); *E06B 3/70* (2013.01); *E06B 2003/7044* (2013.01)

(58) Field of Classification Search
CPC . E06B 3/5486; E06B 3/44; E06B 3/70; E06B 2003/7044; E05D 15/16; E05D 15/24
(Continued)

(56) References Cited

U.S. PATENT DOCUMENTS

| | | | | |
|---|---|---|---|---|
| 6,672,362 B1 * | 1/2004 | Mullet | .................... | E06B 9/582 16/96 L |
| 2015/0128502 A1 * | 5/2015 | Janick | ........................ | E06B 3/44 160/202 |

(Continued)

FOREIGN PATENT DOCUMENTS

| | | | | |
|---|---|---|---|---|
| AU | 2016200918 B1 | 3/2017 | | |
| GB | 2137271 A * | 10/1984 | ............... | E05D 3/00 |
| WO | 2017205911 A1 | 12/2017 | | |

OTHER PUBLICATIONS

International Search Report and Written Opinion of the International Search Authority issued for PCT/AU2019/051052 on Nov. 8, 2019.

*Primary Examiner* — Beth A Stephan
(74) *Attorney, Agent, or Firm* — LeonardPatel PC; Michael A. Leonard II; Sheetal S. Patel

(57) ABSTRACT

A high load retention system for a sectional overhead door enables uninhibited operation of a standard roller track mechanism of a sectional overhead door, while allowing high wind loads to be seamlessly transferred from the track mechanism to a more robust high load jamb retaining element. The system comprises: a plurality of primary door panels, each having a front face; a primary track; engagement elements each having a first end connected to a primary door panel and a second end that rides in the primary track; a high load jamb retaining element positioned adjacent to the primary track and having a clasping portion; and a high load door retaining element connected to a primary door panel (Continued)

and having a clasping portion corresponding to the clasping portion of the high load jamb retaining element.

14 Claims, 10 Drawing Sheets

(58) Field of Classification Search
USPC .......................................................... 160/218
See application file for complete search history.

(56) References Cited

U.S. PATENT DOCUMENTS

| | | | | |
|---|---|---|---|---|
| 2015/0218873 | A1* | 8/2015 | Cappellotto | E06B 3/44<br>49/102 |
| 2017/0247937 | A1* | 8/2017 | Haba | E06B 3/54 |

* cited by examiner

HIGH LOAD RETENTION SYSTEM FOR SECTIONAL OVERHEAD DOORS

FIELD OF THE INVENTION

The present invention relates generally to systems and methods for retaining and securing sectional overhead doors in place when under high loads due for example to high wind loading.

BACKGROUND

Sectional overhead doors are very popular for sealing and securing large doorways in buildings such as garages, sheds, hangers and factories. Generally, such sectional overhead doors include several panels that are connected together with horizontal hinges positioned across the top and bottom of the panels. The sides of the panels on each side of the doorway engage with roller tracks that bend from a vertical orientation adjacent the doorway to a horizontal orientation across the ceiling of the building. That enables the sections to move from a vertical, closed position in front of the doorway to a horizontal, open position above and behind the doorway.

However, in high load conditions, such as under the force of high winds, the roller tracks are sometimes not strong enough to withstand the pressure against the panels, which can result in damage to the track mechanisms or even complete failure of the door.

Accordingly, sectional overhead door manufacturers have designed various mechanisms for strengthening such doors, including stronger tracks, additional bracing, and reinforcing elements.

However, such door strengthening mechanisms are often cost prohibitive, overly complex, or unreliable, leading to failure of the door operation, whether under high wind loading or just normal operation. Also, such door strengthening mechanisms are generally integrated only into new door designs, and cannot be retro-fit to existing sectional overhead doors.

Further, in 2013 new Australian standard AS4505:2012 was released, which requires that roller doors for use in cyclonic wind regions be made even stronger. In response, the industry created a solution for strengthening sectional overhead doors by adding a central post that needs to be installed in the center of the door when a storm was approaching or at the time when high winds are present. Although such posts do add considerably to a door's strength, the inconvenience of regularly installing and removing such posts is significant.

There is therefore a need for an improved high load retention system for sectional overhead doors.

OBJECT OF THE INVENTION

It is an object of the present invention to overcome and/or alleviate one or more of the disadvantages of the prior art or provide the consumer with a useful or commercial choice.

SUMMARY OF THE INVENTION

In a first aspect, although it need not be the only or the broadest aspect, the invention resides in a high load retention system for a sectional overhead door, the system comprising:

a plurality of primary door panels, each having a front face;

a primary track;

engagement elements each having a first end connected to a primary door panel and a second end that rides in the primary track;

a high load jamb retaining element positioned adjacent to the primary track and having a clasping portion; and a high load door retaining element connected to a primary door panel and having a clasping portion corresponding to the clasping portion of the high load jamb retaining element;

wherein in the absence of a load pressing against the front face of a primary door panel the clasping portion of the high load jamb retaining element and the clasping portion of the high load door retaining element do not overlap along a direction normal to the front face of the primary door panel; and wherein under a load pressing against the front face of a primary door panel the clasping portion of the high load jamb retaining element and the clasping portion of the high load door retaining element engage with each other in response to the load causing a bending of the front face of the primary door panel and a resulting movement of the clasping portion of the high load door retaining element toward the clasping portion of the high load jamb retaining element.

Preferably, the high load jamb retaining element is installed independently of the primary track onto a door jamb adjacent the door.

Preferably, along an axis parallel to a top edge of a primary door panel, the clasping portion of the high load door retaining element is positioned between the clasping portion of the high load jamb retaining element and the primary track.

Preferably, the high load jamb retaining element comprises a continuous stile.

Preferably, the high load jamb retaining element comprises a discrete hook.

Preferably, the high load jamb retaining element comprises an extrusion.

Preferably, a roller is attached to the second end of each of the engagement elements.

Preferably, the primary track curves from a generally vertical orientation to a generally horizontal orientation near a top portion of the sectional overhead door.

Preferably, a primary track and a high load jamb retaining element are positioned on a door jamb on both the left and the right sides of the sectional overhead door.

Preferably, the high load door retaining element and the high load jamb retaining element can be retrofit to an existing sectional overhead door.

Preferably, the system further comprises a plurality of high load door retaining elements and high load jamb retaining elements.

Preferably, either or both of the high load door retaining elements and high load jamb retaining elements are made in the form of a series of discrete hooks positioned along the edges of a plurality of primary door panels and a door jamb, respectively.

Preferably, the high load jamb retaining element is integrated into a primary track and bracket system.

Preferably, the high load jamb retaining element is installed onto a door jamb independently of the primary track, and wherein the bracket and the retaining element can be independently bolted to the door jamb.

Preferably, during normal or low wind load operation, the high load jamb retaining element and the high load door retaining element remain disengaged from each other and do not interfere with each other during opening and closing of the door.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

DETAILED DESCRIPTION OF THE PREFERRED EMBODIMENT

Figure 1:
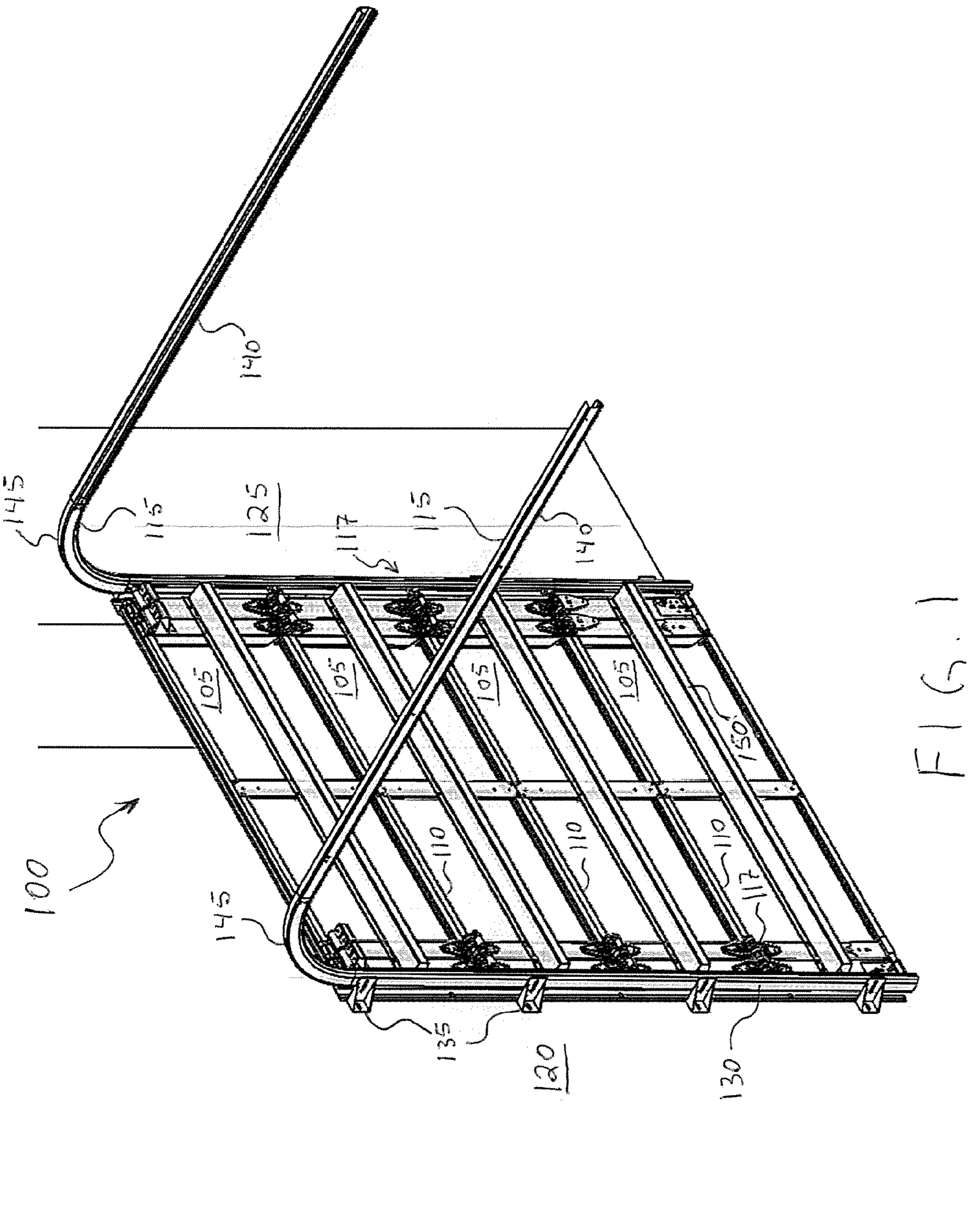
FIG. 1 is a rear side perspective view of a sectional overhead door system in a fully closed position, according to an embodiment of the present invention.

The present invention relates to an improved high load retention system for sectional overhead doors. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, above and below, top and bottom, upper and lower, rear, front and side, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

According to one aspect, the present invention is defined as a high load retention system for a sectional overhead door, the system comprising:

a plurality of primary door panels, each having a front face;

a primary track;

engagement elements each having a first end connected to a primary door panel and a second end that rides in the primary track;

a high load jamb retaining element positioned adjacent to the primary track and having a clasping portion; and a high load door retaining element connected to a primary door panel and having a clasping portion corresponding to the clasping portion of the high load jamb retaining element;

wherein in the absence of a load pressing against the front face of a primary door panel the clasping portion of the high load jamb retaining element and the clasping portion of the high load door retaining element do not overlap along a direction normal to the front face of the primary door panel; and wherein under a load pressing against the front face of a primary door panel the clasping portion of the high load jamb retaining element and the clasping portion of the high load door retaining element engage with each other in response to the load causing a bending of the front face of the primary door panel and a resulting movement of the clasping portion of the high load door retaining element toward the clasping portion of the high load jamb retaining element.

Advantages of some embodiments of the present invention include a system that enables uninhibited operation of a standard roller track mechanism of a sectional overhead door, while allowing high wind loads to be seamlessly transferred from the track mechanism to a more robust high load jamb retaining element. Further, according to some embodiments, when a door is not under load the lateral spacing between the high load jamb retaining element and the high load door retaining element enables the high load door retaining element to move inward and away from the high load jamb retaining element during a door opening process, without interfering with the high load jamb retaining element, and as the door slides into an open position above the doorway.

Further, according to some embodiments, systems of the present invention can be retrofit to an existing sectional overhead door, enabling older doors that do not comply with current wind load standards to be strengthened to meet the standards requirements.

Further, according to some embodiments, systems of the present invention can be implemented at low cost and require no additional maintenance and no additional operating steps compared to a standard sectional overhead door. The high load retaining features operate automatically when a door flexes under a wind load, yet otherwise the features make no interference with normal door operation.

Those skilled in the art will appreciate that not all of the above advantages are necessarily included in all embodiments of the present invention.

Figure 2:
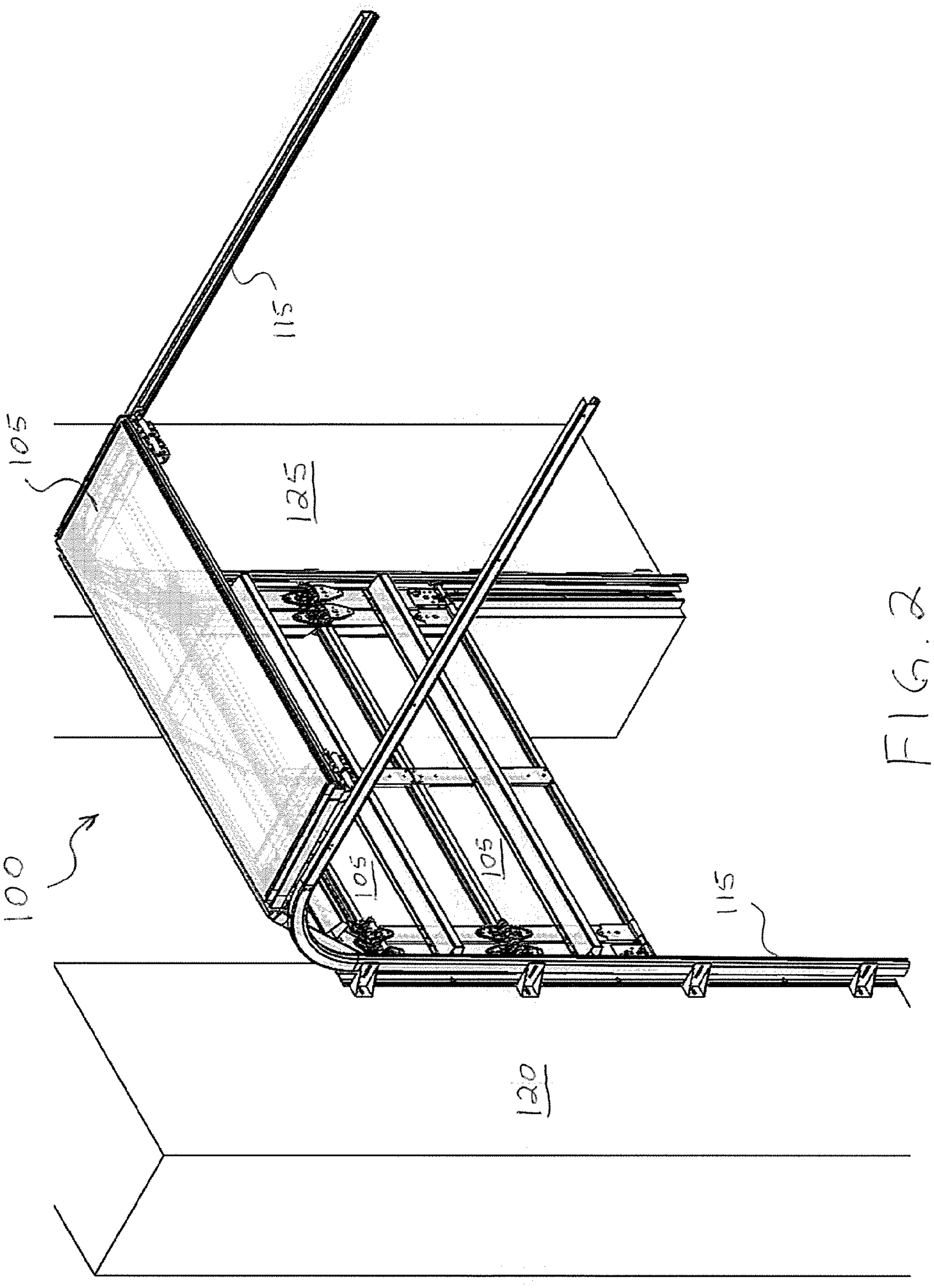
FIG. 2 is a rear side perspective view of the sectional overhead door system of FIG. 1 in a partially opened position.
Figure 3:
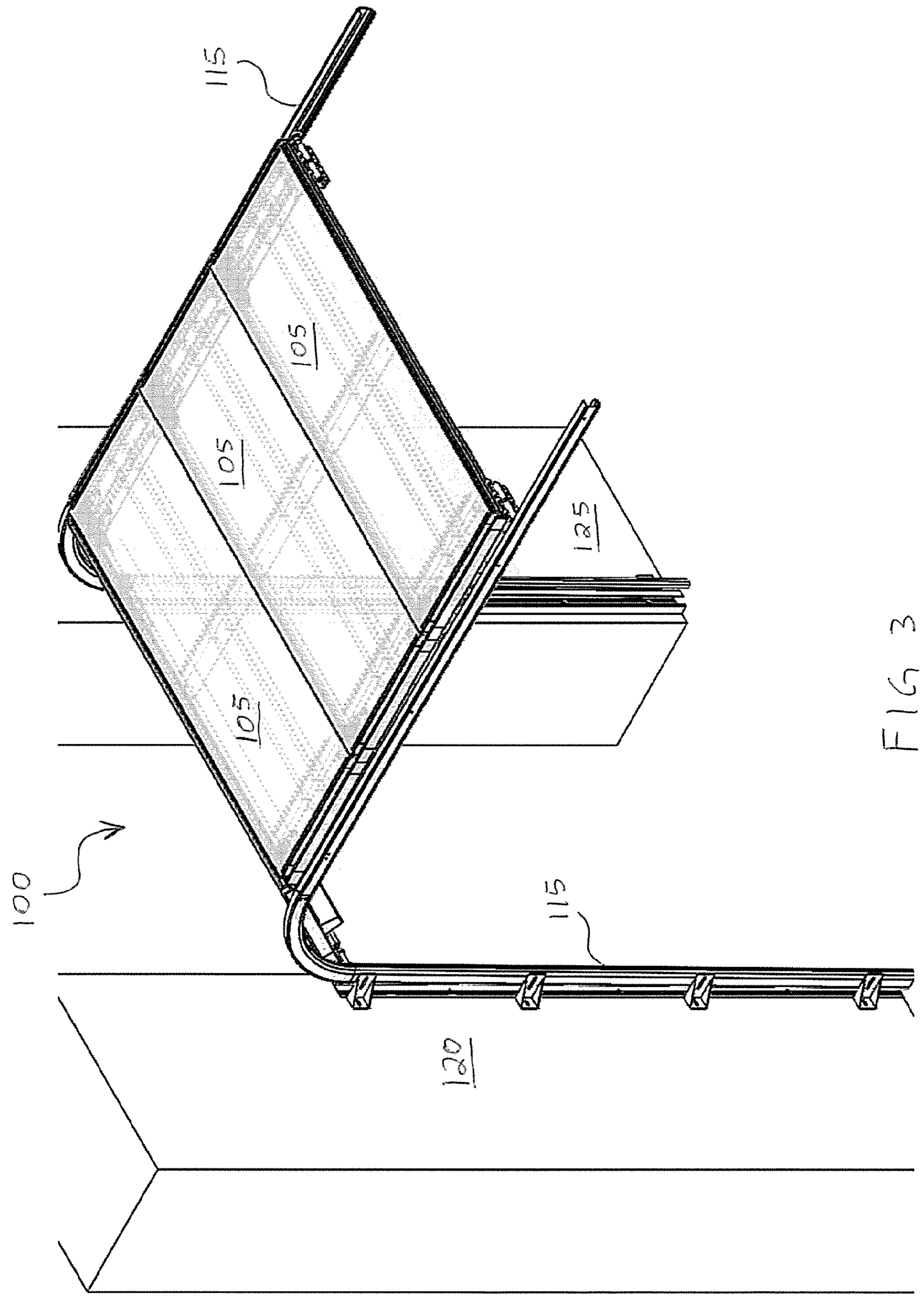
FIG. 3 is a rear side perspective view of the sectional overhead door system of FIG. 1 in a fully opened position.

FIGS. 1-3 illustrate a sectional overhead door system 100 in fully closed, partially open, and fully open positions, respectively, according to an embodiment of the present invention. For purposes of this specification, FIGS. 1-3 are considered to be viewing a rear side of the door from a viewpoint inside of a building or enclosure.

FIG. 1 is a rear side perspective view of the sectional overhead door system 100 in a fully closed position. The system 100 includes a plurality of primary door panels 105, which are connected together by hinges 110. A primary track 115 in the form of a roller track is bolted to the left door jamb 120, and a corresponding primary track 115 is bolted to the right door jamb 125. Engagement elements 117 each have a first end connected to a primary door panel 105 and a second end that rides in the primary track 115. As shown, engagement elements 117 are connected to left and right ends of the hinges 110.

As shown, each primary track 115 includes a straight vertical section 130 that is bolted to the door jamb 120, 125 using brackets 135, and a straight horizontal section 140. The straight vertical and horizontal sections 130, 140 are connected together using a curved track section 145, which curves gradually away from the door jambs 120, 125, enabling the door panels 105 to smoothly transition from a closed vertical orientation in front of the doorway to an open horizontal position above the doorway when opened.

The primary door panels 105 each include a transverse reinforcing beam 150 extending across the width of the panel 105.

FIG. 2 is a rear side perspective view of the sectional overhead door system 100 in a partially opened position, according to an embodiment of the present invention. As shown, a single primary door panel 105 has transitioned from a vertical to a horizontal orientation.

FIG. 3 is a rear side perspective view of the sectional overhead door system 100 in a fully opened position, according to an embodiment of the present invention.

Figure 4:
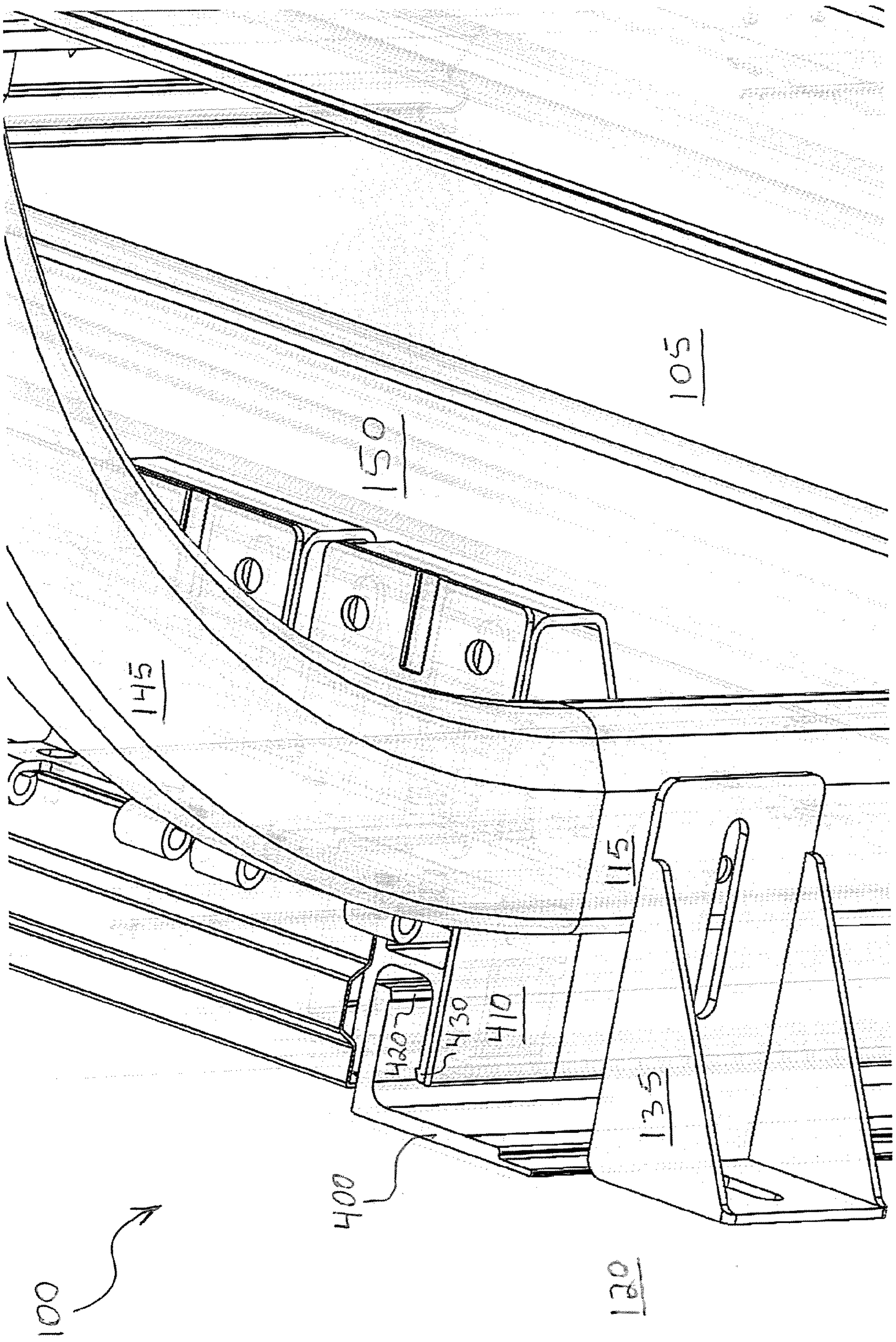
FIG. 4 is a close-up side perspective view of an upper left portion of the sectional overhead door system of FIG. 1.

FIG. 4 is a close-up side perspective view of an upper left portion of the sectional overhead door system 100. A top end of a high load jamb retaining element 400 is shown installed onto the left door jamb 120 adjacent to a bracket 135 that supports the left primary track 115, and just below the left curved track section 145. A top end of a corresponding high load door retaining element 410 is shown positioned adjacent to the high load jamb retaining element 400. The high load jamb retaining element 410 is fixed to a left side of a primary door panel 105. As will be understood, similar corresponding elements are present on the right side of the sectional overhead door system 100.

A clasping portion 420 of the high load jamb retaining element 400 is shown disengaged from a clasping portion 430 of the high load door retaining element 410. Thus, during normal or low wind load operation, the high load jamb retaining element 400 and the high load door retaining element 410 remain disengaged from each other and do not interfere with each other during operation of the system 100.

Figure 5:
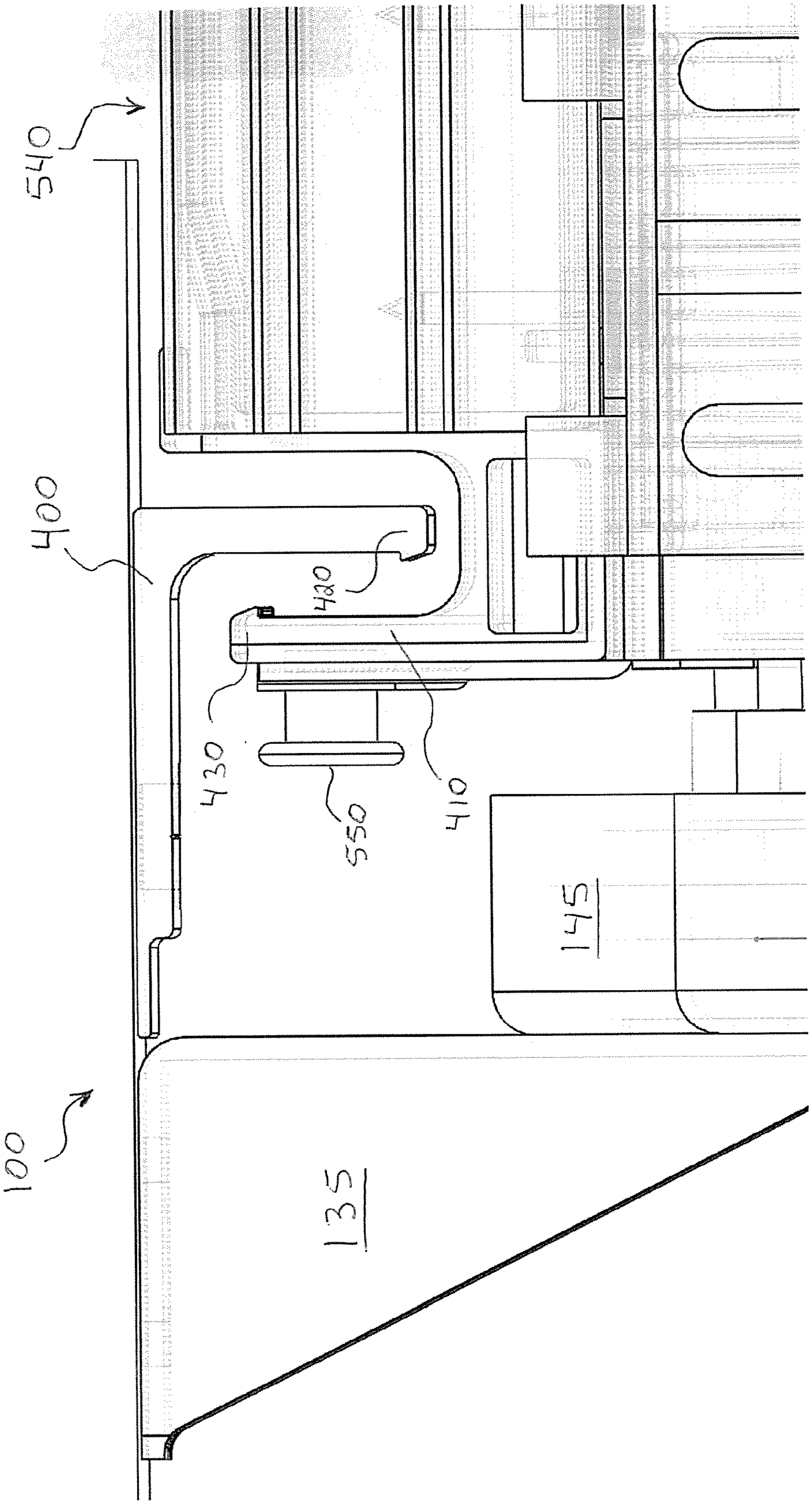
FIG. 5 is a top view of the upper left portion of the sectional overhead door system of FIG. 1, when the primary door panels of the system are under no wind load.
Figure 6:
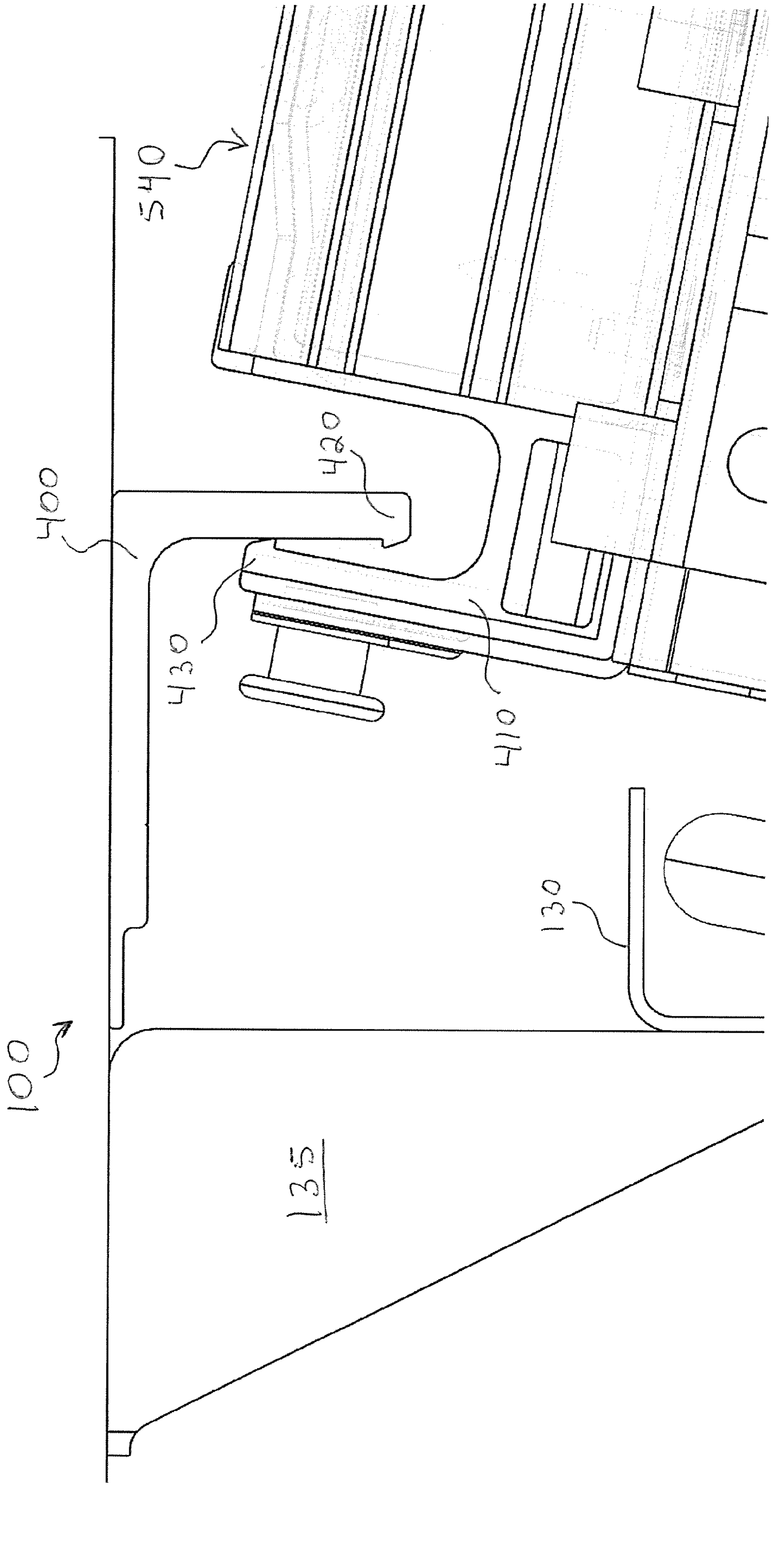
FIG. 6 is a top view of the upper left portion of the sectional overhead door system of FIG. 1, when the primary door panels of the system are under high wind load.
Figure 7:
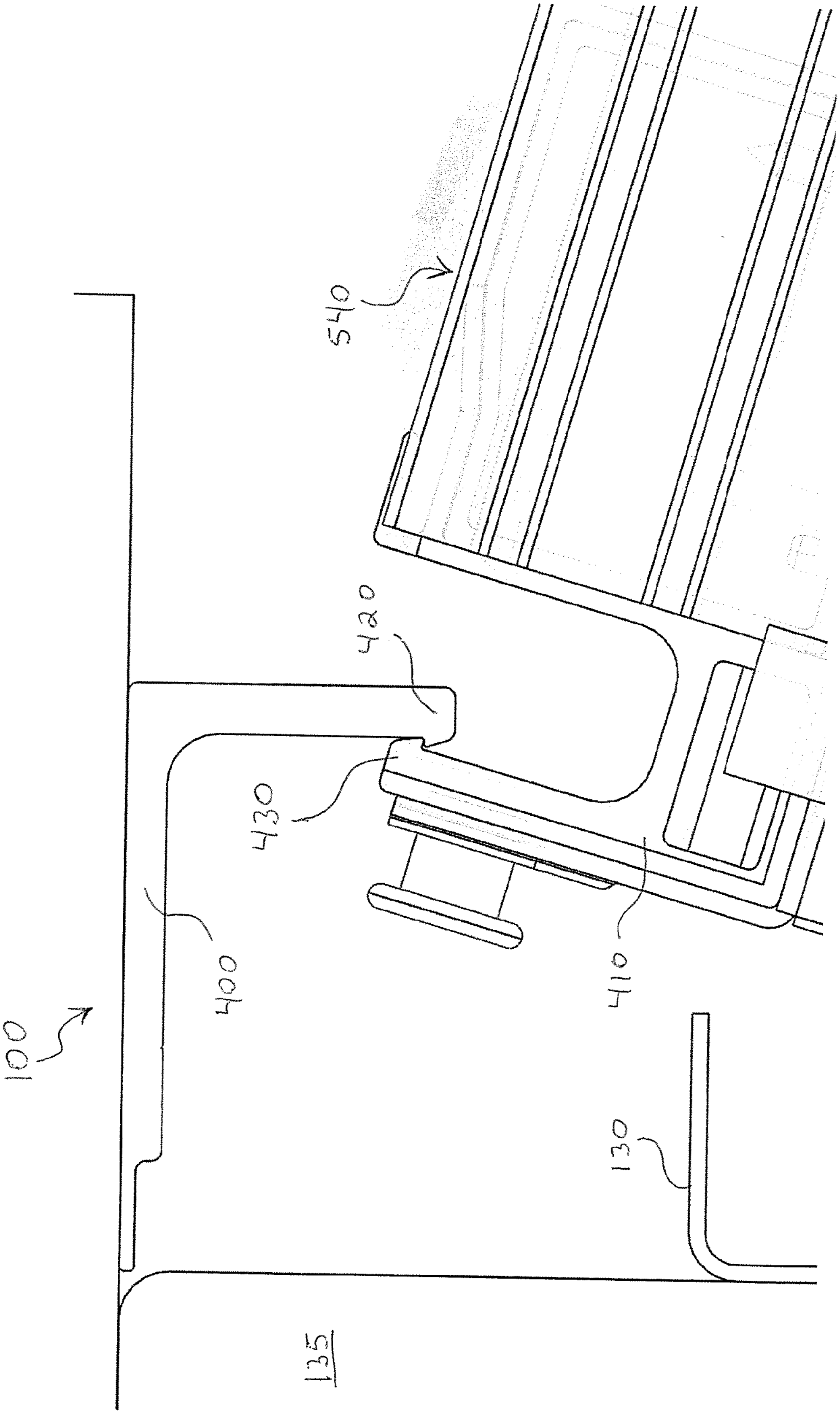
FIG. 7 is a top view of the upper left portion of the sectional overhead door system of FIG. 1, when the primary door panels of the system are under a sustained high wind load.

The operation of the clasping portions 420, 430 when no wind load and high wind loads are pressed against a front face of a primary door panel 105 are illustrated, respectively, in FIGS. 5-7.

FIG. 5 is a top view of the upper left portion of the sectional overhead door system 100, when the primary door panels 105 of the system 100 are under no wind load. As shown the clasping portions 420, 430 of the retaining elements 400, 410, respectively, extend parallel to each other and are spaced laterally apart. In this configuration the clasping portions 420, 430 thus do not overlap along a direction normal to a front face 540 of a primary door panel 105 that is in a closed position in front of the doorway.

According to alternative embodiments, the clasping portions 420, 430 can include various alternative geometries, including simple angled faces that engage with each other or more prominent hook-like projections.

A cable bracket 550 is also shown, to which a cable (not shown) can be secured for lifting the primary door panels 105 upward to an open position.

As shown, the high load jamb retaining element 400 is installed onto the door jamb 120 independently of the primary track 115, where the bracket 135 and the retaining element 400 can be independently bolted to the door jamb 120. That facilitates convenient retrofitting of embodiments of the present invention onto existing sectional overhead doors of the prior art, as a new high load jamb retaining element 400 can be installed adjacent to an existing primary track 115.

Alternatively, according to other embodiments (not shown), a high load jamb retaining element can be integrated into a primary track and bracket system.

FIG. 6 is a top view of the upper left portion of the sectional overhead door system 100, when the primary door panels 105 of the system 100 are under high wind load. In such conditions, the front faces 540 of the primary door panels 105 will deflect inward, generally in the form of a catenary. Such deflection of a primary door panel 105 causes the high load door retaining element 410 to move, as shown, such that eventually the clasping portion 430 contacts an edge of the clasping portion 420 of the high load jamb retaining element 400.

FIG. 7 is a top view of the upper left portion of the sectional overhead door system 100, when the primary door panels 105 of the system 100 are under a sustained high wind load. As shown, further deflection of the primary door panel 105 can cause the high load door retaining element 410 to shift rearward until it is arrested by clasping contact and engagement between the transverse edges of the clasping portions 420, 430.

Following engagement between the transverse edges of the clasping portions 420, 430, increased or sustained wind loading on the front face 540 of the primary door panel 105 is translated directly to the high load jamb retaining element 400. The high load jamb retaining element 400 thus can be appropriately bolted or otherwise securely fastened to the door jamb 120, enabling the sectional overhead door system 100 to withstand sustained high wind loads, without incurring structural fatigue or failure of elements of the primary track 115 or engagement elements 117.

Those skilled in the art will understand that according to some embodiments the clasping portions 420, 430 will also engage with each other and resist further deformation of a primary door panel 105 placed under negative pressure, such as pressure applied against the inside of the panel 105 or a pulling force applied against the outside of the panel 105.

As described herein, loads against a primary door panel 105 can consist of various types of pressures or forces, positive or negative (i.e., pushing against either the front or rear side of a panel 105), such as wind loads or inward or outward forces applied by a person or object, or pulling forces exerted for example by an intruder against a handle on a door.

Figure 8:
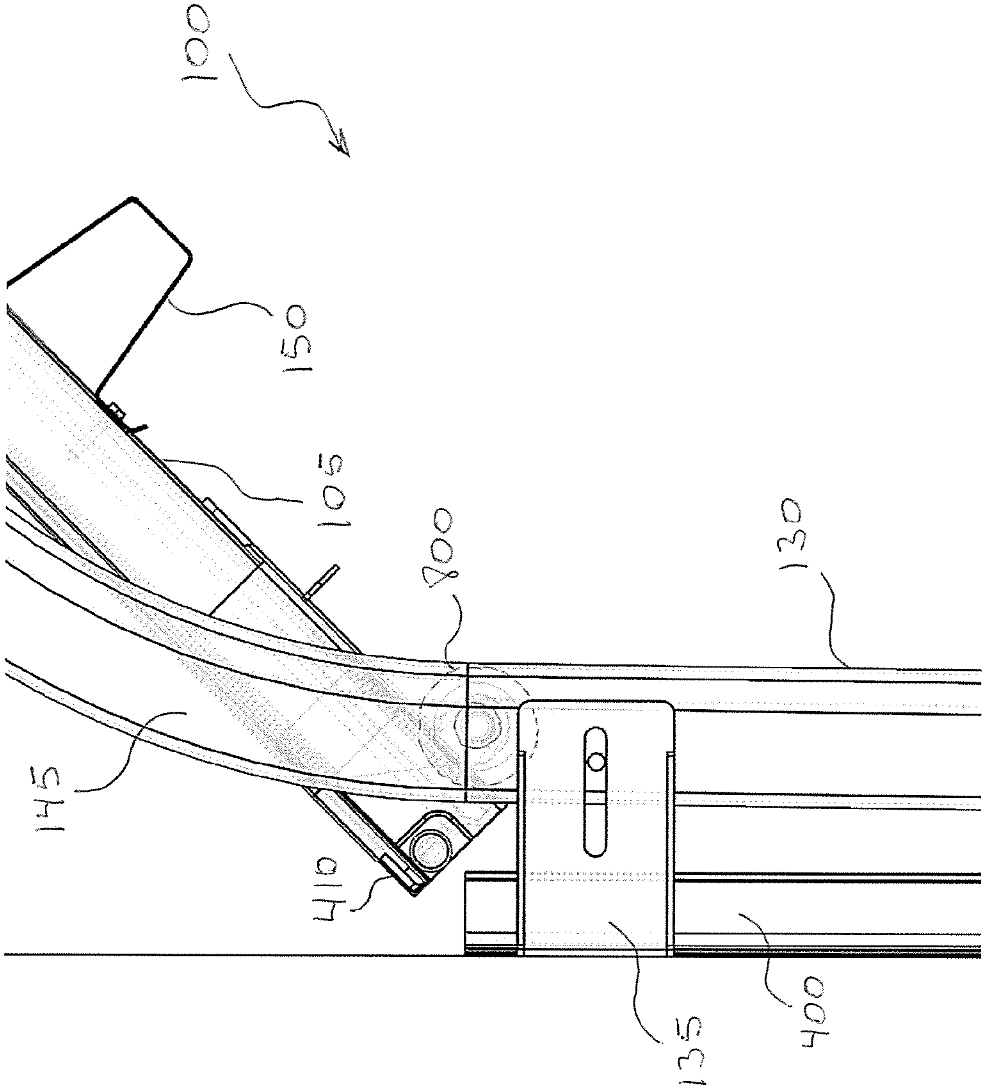
FIG. 8 is a left side view of a top portion of the sectional overhead door system of FIG. 1 in a fully open configuration.

FIG. 8 is a left side view of a top portion of the sectional overhead door system 100 in a fully open configuration. As shown, as the primary door panel 105 is rolled in the primary track 115 to an angle of approximately 45 degrees, the high load door retaining element 410 moves upward and rearward, away from the high load jamb retaining element 400. Also shown in phantom is a primary track roller 800 positioned inside the primary track 115.

Figure 9:
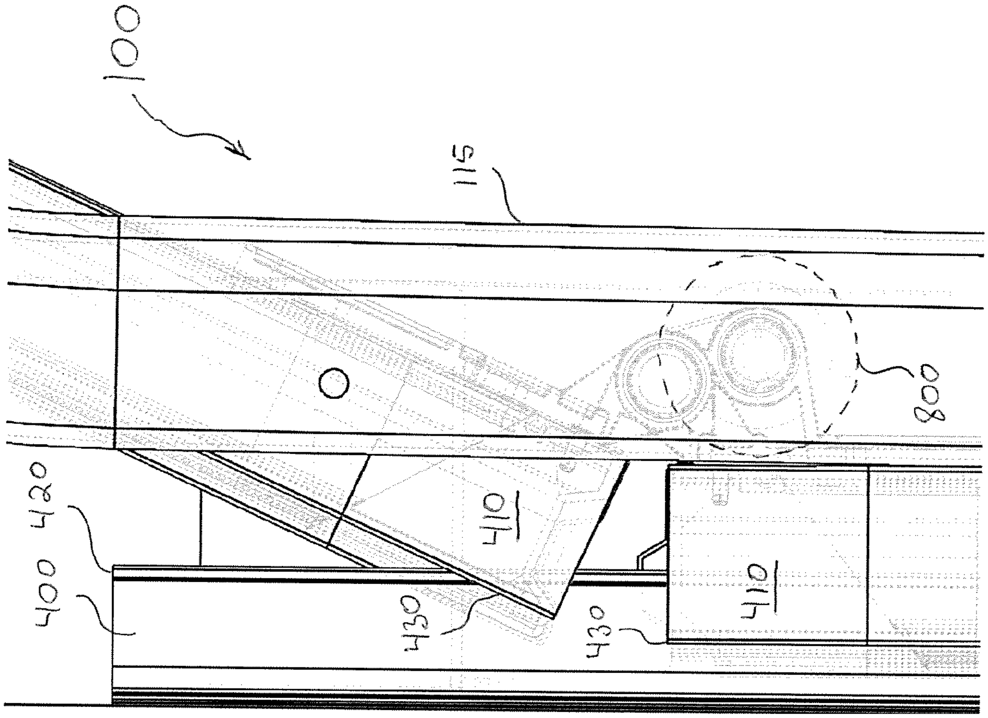
FIG. 9 is a left side view of a top portion of the sectional overhead door system of FIG. 1 in a partially open configuration.

FIG. 9 is a left side view of a top portion of the sectional overhead door system 100 in a partially open configuration. This view shows the clasping portion 430 of the high load door retaining element 410 of the uppermost primary door panel 105 in a position substantially inward and well clear of the high load jamb retaining element 400.

As shown, the high load door and jamb retaining elements 400, 410 can be made in the form of continuous stiles, such as high strength metal extrusions. Alternatively, according to other embodiments (not shown), either or both of the high load door and jamb retaining elements 400, 410 can be made in the form of a series of discrete hooks positioned along the edges of the door jamb 120 and the primary door panels 105, respectively.

Figure 10:
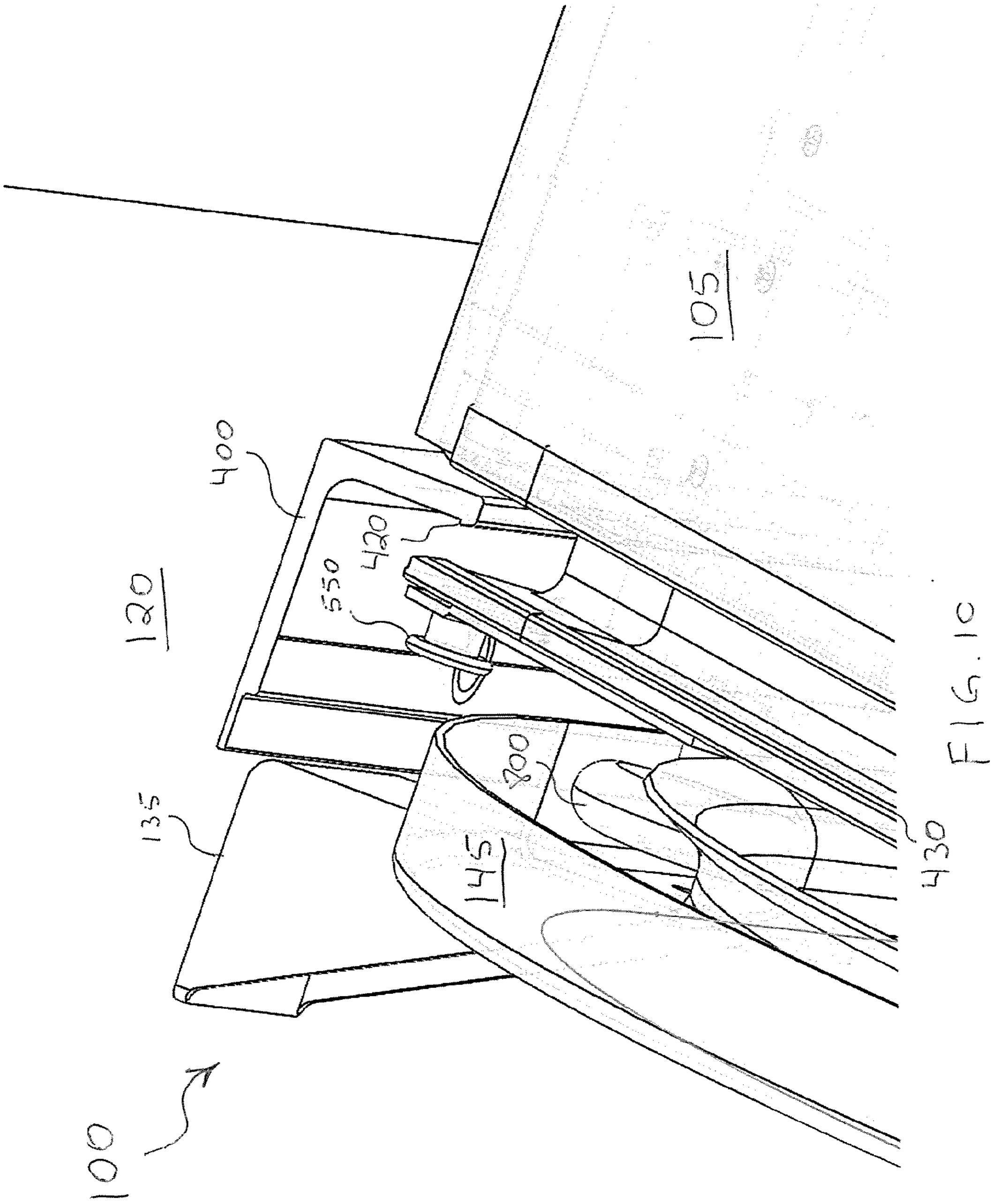
FIG. 10 is a left side view of a top portion of the sectional overhead door system of FIG. 1 in a partially open configuration, where at least one primary door panel is angled significantly away from the vertical.

FIG. 10 is a left side view of a top portion of the sectional overhead door system 100 in a partially open configuration, where at least one primary door panel 105 is angled significantly away from the vertical. The clasping portion 430 of the high load door retaining element 410 is thus at an oblique angle relative to the clasping portion 420 of the high load jamb retaining element 400.

Those skilled in the art will appreciate that various components of embodiments of the present invention can be made of various materials, including steel, steel alloys and other metal alloys, various polymers and wood, or a combination of such materials.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A high load retention system for a sectional overhead door, the system comprising:

a plurality of primary door panels, each comprising a front face;

a primary track;

a plurality of engagement elements, each engagement element comprising a first end connected to a primary door panel of the plurality of primary door panels and a second end that rides in the primary track;

a high load jamb retaining element positioned adjacent to the primary track and comprising a clasping portion, wherein the high load jamb retaining element is L-shaped and comprises mutually perpendicular first and second portions, the first portion is perpendicular to the front face of a primary door panel of the plurality of primary door panels and defining the clasping portion of the high load jamb retaining element, and the second portion is parallel to the front face of the primary door panel of the plurality of primary door panels and configured to be connected to a door jamb; and a high load door retaining element connected to the primary door panel of the plurality of primary door panels and comprising a clasping portion corresponding to the clasping portion of the high load jamb retaining element;

wherein in the absence of a load pressing against the front face of the primary door panel of the plurality of primary door panels, the clasping portion of the high load jamb retaining element and the clasping portion of the high load door retaining element do not overlap along a direction normal to the front face of the primary door panel of the plurality of primary door panels, and the primary door panel of the plurality of primary door panels is configured to move inward and clear of the high load jamb retaining element; and wherein under a load pressing against the front face of the primary door panel of the plurality of primary door panels, the clasping portion of the high load jamb retaining element and the clasping portion of the high load door retaining element engage with each other in response to the load, causing a bending of the front face of the primary door panel of the plurality of primary door panels and a resulting movement of the clasping portion of the high load door retaining element toward the clasping portion of the high load jamb retaining element.

2. The system of claim 1, wherein the high load jamb retaining element is configured to be installed independently of the primary track onto the door jamb adjacent the door.

3. The system of claim 1, wherein, along an axis parallel to a top edge of the primary door panel of the plurality of primary door panels, the clasping portion of the high load door retaining element is positioned between the clasping portion of the high load jamb retaining element and the primary track.

4. The system of claim 1, wherein the high load jamb retaining element comprises a continuous stile.

5. The system of claim 1, wherein the high load jamb retaining element comprises a discrete hook.

6. The system of claim 1, wherein the high load jamb retaining element comprises an extrusion.

7. The system of claim 1, wherein a roller is attached to the second end of each of the engagement elements.

8. The system of claim 1, wherein the primary track curves from a generally vertical orientation to a generally horizontal orientation near a top portion of the sectional overhead door responsive to the primary track being used with the door.

9. The system of claim 1, further comprising:

the door jamb adjacent to each of a left and a right side of the door, wherein the primary track and the high load jamb retaining element are positioned on the door jamb adjacent to the left side of the sectional overhead door, and a second primary track and a second high load jamb retaining element are positioned on the door jamb adjacent the right side of the sectional overhead door.

10. The system of claim 1, wherein the high load door retaining element and the high load jamb retaining element is configured to be retrofit to an existing sectional overhead door.

11. The system of claim 1, wherein the high load door retaining element comprises a plurality of high load door retaining elements and the high load jamb retaining element comprises a plurality of high load jamb retaining elements.

12. The system of claim 11, wherein either or both of the high load door retaining elements and high load jamb retaining elements are made in the form of a series of discrete hooks positioned along the edges of the plurality of primary door panels and a door jamb, respectively.

13. The system of claim 1, wherein the high load jamb retaining element is configured to be installed onto the door jamb independently of the primary track, and wherein high load jamb retaining element is configured to be independently bolted to the door jamb.

14. The system of claim 1, wherein during normal or low wind load operation, the high load jamb retaining element and the high load door retaining element remain disengaged from each other and do not interfere with each other during opening and closing of the door.

* * * * *